Aug. 5, 1969     M. LADNEY, JR     3,459,891

FLOW COATING APPARATUS

Filed Dec. 20, 1965     4 Sheets-Sheet 1

INVENTOR.
MICHAEL LADNEY, JR.

BY
Barnes, Kisselle, Raisch & Choate

ATTORNEYS

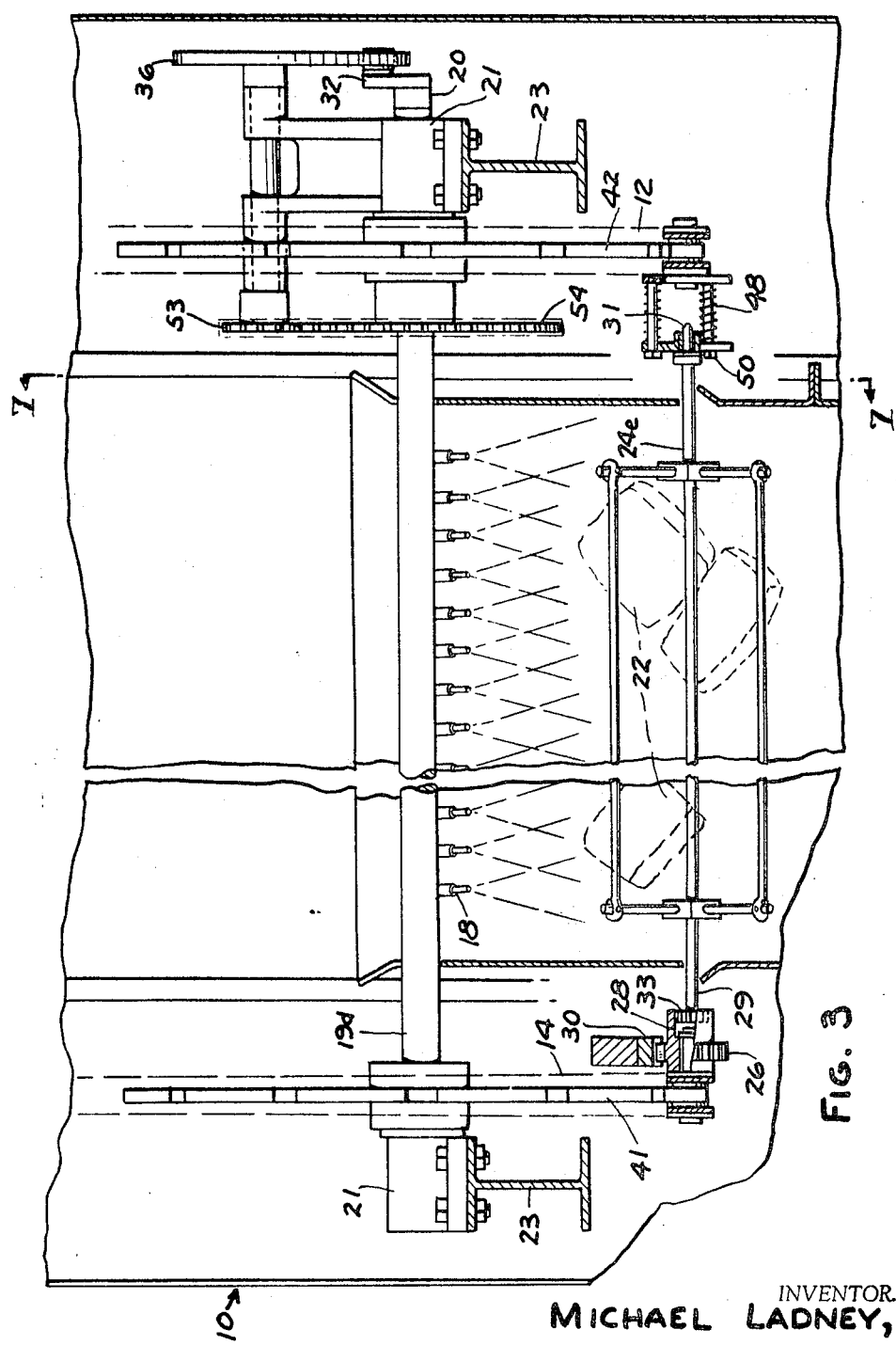

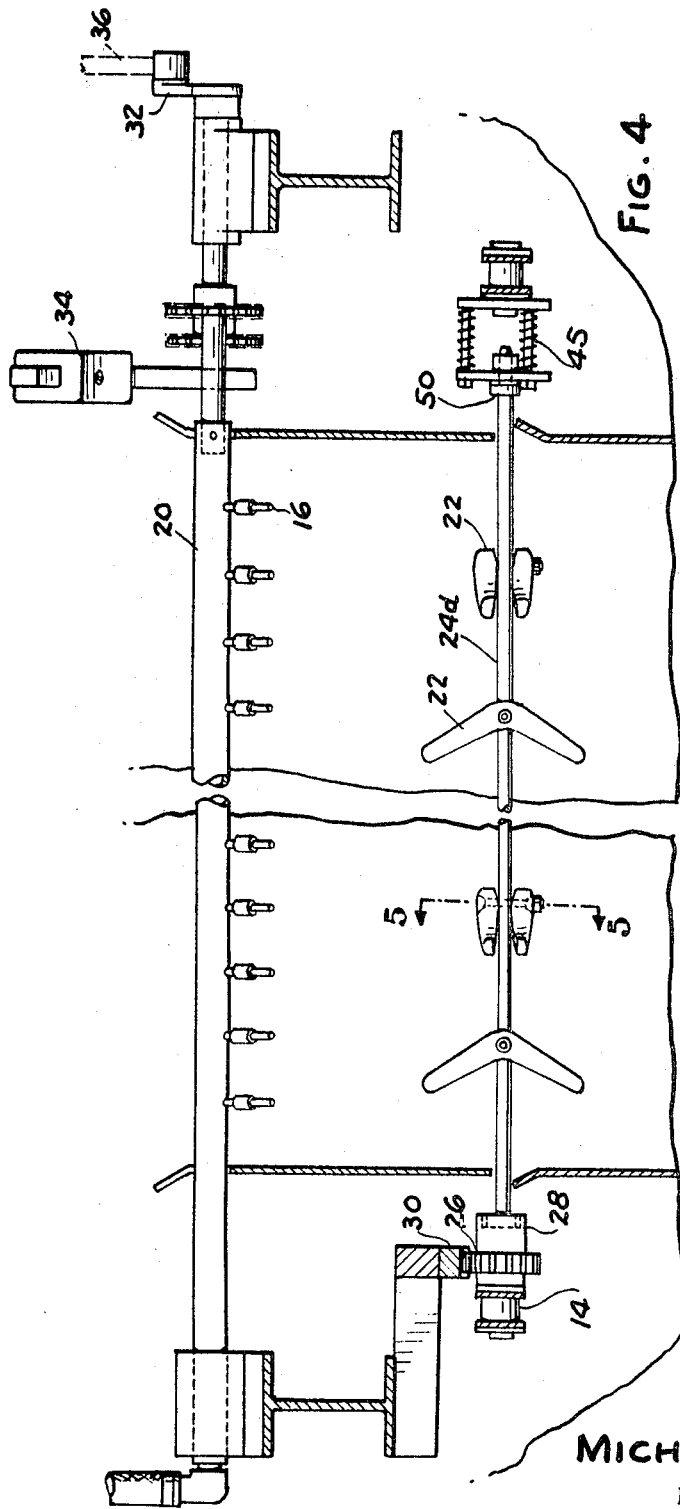
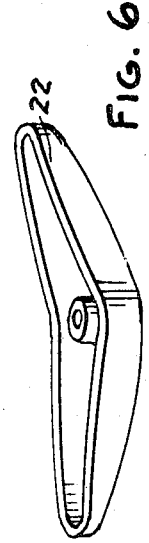
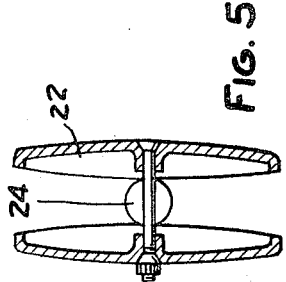

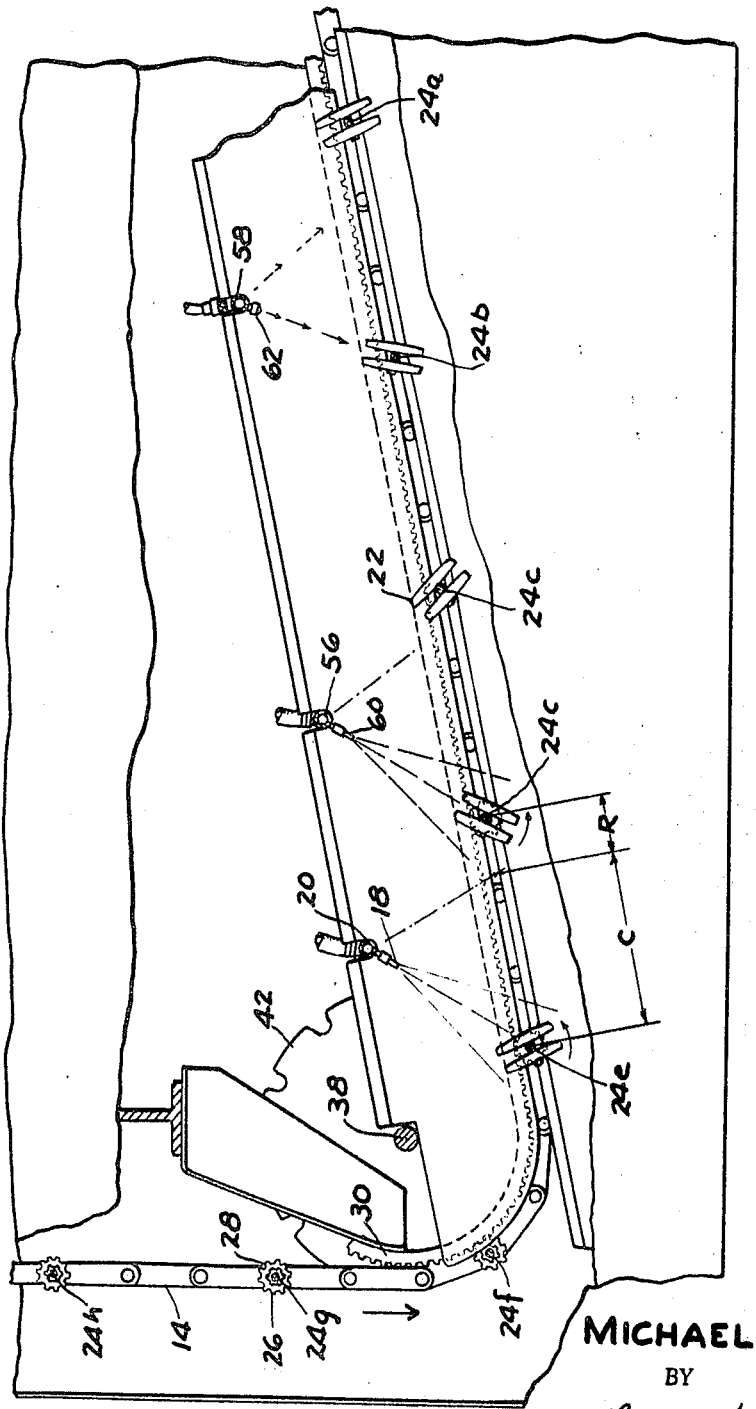

United States Patent Office 3,459,891
Patented Aug. 5, 1969

1

3,459,891
FLOW COATING APPARATUS
Michael Ladney, Jr., Grosse Pointe Shores, Mich.
(18125 E. 10 Mile Road, East Detroit, Mich. 48021)
Filed Dec. 20, 1965, Ser. No. 514,849
Int. Cl. B05c 5/02, 11/14, 11/06
U.S. Cl. 118—63                                    7 Claims

ABSTRACT OF THE DISCLOSURE

Apparatus for flow coating articles including conveyor means for rotating articles about a horizontal axis while passing the articles below a plurality of rows of oscillating nozzles. The oscillation of the nozzles is synchronized with the rotation of the articles moving on the conveyor.

This invention relates to coating and particularly to an apparatus for flow coating workpieces by means of a liquid stream which follows the workpieces while they travel on a conveyor through a coating area.

In the manufacture of many workpieces, it becomes necessary to apply to the workpieces a thin coating of material, such as lacquer, varnish, etc. For example, in the manufacture of decorative plastic parts which are vacuum metallized, it is general practice to flow coat the workpieces before vacuum metallizing to provide a bond to the plastic for the vaporized metal film and also after vacuum metallizing to form a protective coating over the metal film deposited on the workpieces. Such flow coating normally involves moving the plastic parts on a conveyor along a path in which numerous nozzles for coating material are oriented so as to completely cover the part with coating material. Such coating materials are usually very thin, containing a relatively high percentage of a highly volatile solvent such as thinner. The excess material flowing over the parts is collected in a trough or pan located below the parts being flow coated and is recirculated through the nozzles. Some solvent evaporates and ordinarily is removed as waste material.

An object of the invention is to minimize the number of nozzles required to flow coat a workpiece completely.

Another object of the invention is to reduce waste of coating material in flow coating workpieces.

A further object of the invention is to impart motions to the nozzles and the workpieces while the workpieces travel past the nozzles on a conveyor so as to save coating material and reduce the number of nozzles required for complete coverage of the workpieces.

Another object is to so synchronize the motions of the nozzles and the workpieces as to increase the efficiency of the flow coating application.

Among the other objects of the invention are to minimize plugging of the nozzles, to reduce the amount of coating material supplied through the nozzles and to minimize the occurrence of entrained air bubbles in the coating on the workpieces.

In the drawings:

FIG. 3 is a sectional view along line 3—3 in FIG. 2.

FIG. 4 is a sectional view taken along line 4—4 in FIG. 2.

2

FIG. 5 is a sectional view of a work supporting spindle taken along line 5—5 in FIG. 4 and showing a workpiece mounted thereon.

FIG. 6 is a perspective view of a workpiece.

FIG. 7 is a sectional view taken on line 7—7 of FIG. 3 showing in particular the structure for rotating the workpieces.

Figure 1:
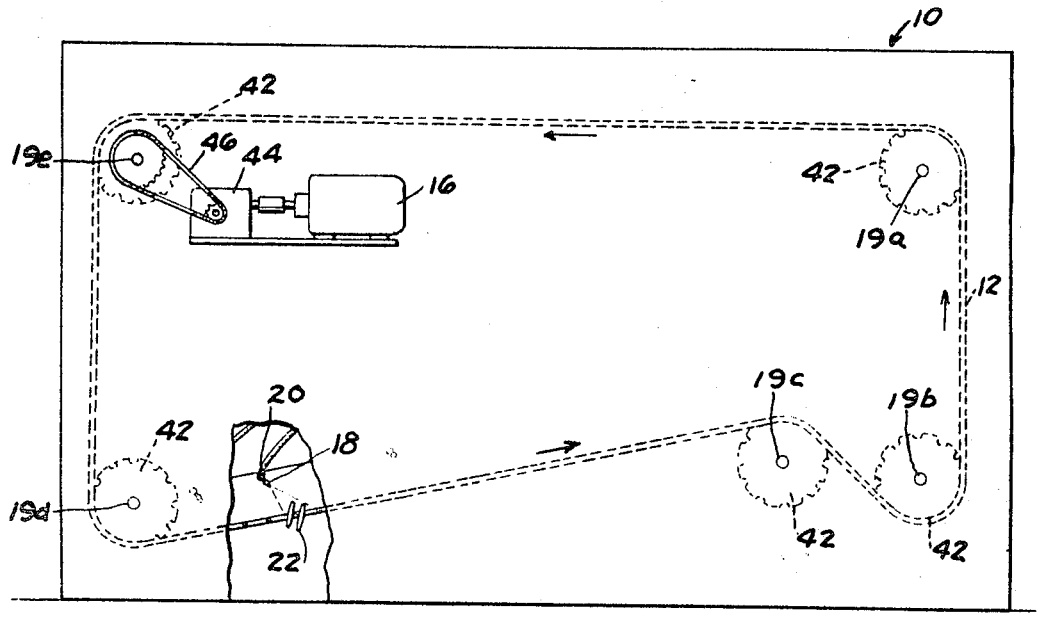
FIG. 1 is a side elevational view of a flow coating machine according to this invention with a portion of the housing cut away to show a workpiece on a conveyor and a nozzle for directing coating liquid on the workpiece.

Referring to the drawings, the flow coating apparatus of this invention includes a housing 10 in which are mounted a pair of sprocket-driven chains 12 and 14 of a conveyor. In FIG. 3, chain 12 and a sprocket 41 are at the left side, and chain 14 and sprocket 42 are located near the right side. As shown in FIG. 1, the sprockets are affixed to shafts 19a, 19b, 19c, 19d and 19e, and the chains are endless loops running about the sprockets. A motor 16 of the conveyor supplies power to move chains 12 and 14. A series of nozzles 18 are supported on a shaft 20 (see FIG. 4). Workpieces 22 are supported by spindles 24a, 24b, 24c, 24d, 24e, 24f, 24g and 24h which extend between the two chains 12 and 14 (see particularly FIG. 7). The chains 12 and 14 are positioned to carry the workpieces 22 through streams which flow from the nozzles 18. Hollow pinions 26 journalled on chain 14 and having a socket 28 therein connect each spindle 24 at one end with chain 14. A curved rack 30 (FIG. 7) is supported in a position to be engaged by a traveling pinion 26 so that pinion 26 walks along rack 30 and is thereby rotated as its spindle 24 passes through the coating area under nozzles 18.

A follower arm 32 is attached to shaft 20 (at its right end in FIG. 4) and is biased by a counterweight 34 (see FIG. 2) against a cam 36 which is connected to rotate in response to movement of chains 12 and 14. Counterweight 34 is affixed to a second nozzle supporting shaft 56 and exerts biasing force on cam follower 32 via sprockets 55, 57 and chain 59. The second nozzle supporting shaft is optional, and if it is omitted, counterweight 34 may be affixed to shaft 20. Cam 36, acting through follower arm 32, imparts an oscillating motion to nozzles 18. Cam 36 causes nozzles 18 to swing in the direction of the conveyor's travel while the workpieces on a given spindle are also rotating within the liquid stream. After following this travel for a predetermined time period, nozzles 18 are swung by cam 36 in the direction opposite the conveyor's travel in order to coat the following workpieces.

Looking at the structure in more detail, shafts 19a through 19e (FIG. 1) are supported for rotation within housing 10 by journal blocks 21 mounted on I-beams 23 (FIG. 3). Each shaft 19 has a pair of sprockets 41 and 42 mounted in spaced relation thereon, sprockets 41 and 42 serving as supports for conveyor chains 12 and 14. Motor 16 (FIG. 1), acting through a gear reduction unit 44, is connected to one of the sprockets by an endless chain 46. Motor 16 provides the power for driving conveyor chains 12 and 14 in a counterclockwise direction as viewed in FIGS. 1, 2, 4 and 7. A plurality of cages 48 are mounted in spaced relation along the laterally inner side of chain 12. Each cage 48 (FIG. 3) has a socket 50 adapted to receive one end of a spindle such as spindle 24e. Hollow pinions 26 are mounted on the laterally inner side of chain 14 opposite each cage 48. The socket 28 on each pinion 26 is adapted for receiving the other end of a spindle. In FIG. 3, it may be seen that the end 29 of spindle 24e is received in socket 28 and has teeth 33 which interengage with teeth on the inside of socket 28. The other end 31 of spindle 24e is free to rotate in socket 50 of cage 48. Rack 30 is positioned in housing 10 to be engaged by a pinion 26 just before the workpieces on its spindle, say spindle 24e, enter into the coating area of nozzles 18. As previously mentioned, the engagement of pinion 26 with rack 30 imparts a rotational movement to spindle 24e and hence to the workpieces 22 mounted thereon. The rate of rotation of any given spindle 24 is directly proportional to the speed of the conveyor chains 12 and 14. This rate of rotation may be altered by changing the gear ratio of the rack and pinion.

Figure 2:
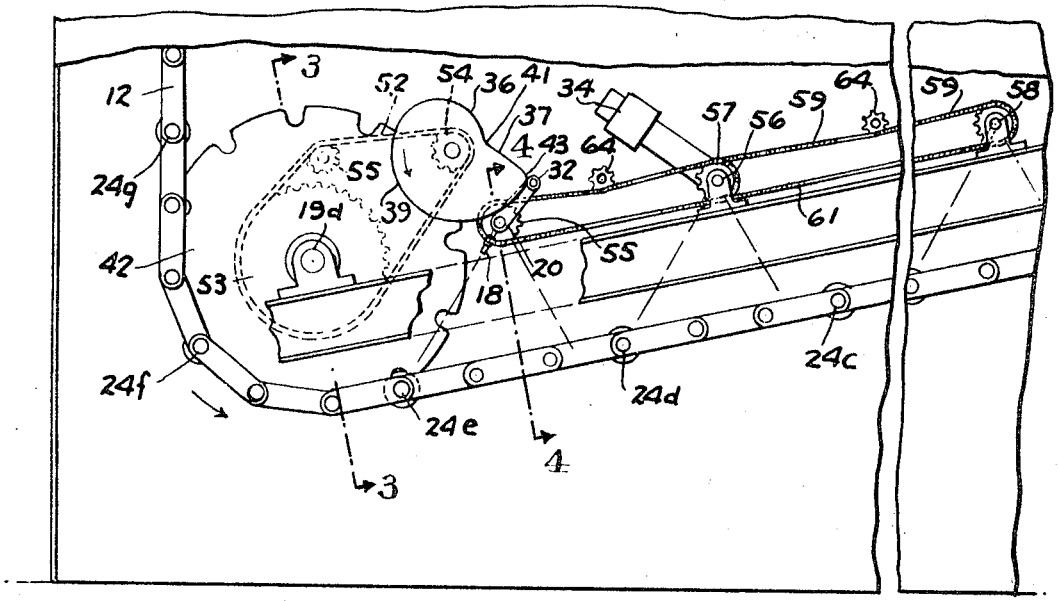
FIG. 2 is a fragmentary view of the lower left-hand corner of the machine of FIG. 1, the housing being cut away.

Cam 36 preferably is mounted adjacent shaft 19d. Cam 36 is connected by means of chain belt 52 (FIG. 2) and sprockets 53 and 54 to sprocket 42. Idler sprocket 55 is used to adjust the tension of chain belt 52. Follower arm 32 attached to shaft 20 is biased against cam 36 by means of counterweight 34 (FIG. 2). Since cam 36 is driven from sprocket 42, its rotational speed is directly proportional to the speed of the conveyor chains 12 and 14. Cam 36 is formed to impart an oscillating movement to nozzles 18; that is, nozzles 18 first swing in the direction of travel of the conveyor chains 12 and 14 and then swing back in the opposite direction. This return movement occurs when follower arm 32 rides on the nearly radial surface 37 of cam 36. Cam 36 also has a spiral surface 39, and follower arm 32 follows spiral surface 39 to cause nozzles 18 to follow the conveyor. The cam and follower arm are shown in FIG. 2 in the positions they assume at the beginning of a coating cycle. The cam rotates counterclockwise, so the end of the cam follower 32 travels counterclockwise about the axis of shaft 20 as spiral surface 39 moves past it. Accordingly, the tips of nozzles 18 also swing counterclockwise about the axis of shaft 20 until point 41 at the end of spiral surface 39 reaches the cam follower. Follower 32 and nozzles 18 then return in the clockwise direction about the axis of shaft 20 as follower 32 rides on surface 37 back to its end at 43. Spindles 24 and the workpieces 22 on them turn counterclockwise as pinions 26 walk along rack 30 and turn counterclockwise as they travel to the right (FIGS. 2, 4 and 7) through the streams flowing from nozzles 18. A spindle enters these streams when point 43 on cam 36 contacts follower 32 and leaves the streams when point 41 reaches the follower. There is no spindle in these streams during the return movement of follower 32 and nozzles 18 which occurs between points 41 and 43 of cams 36.

Cam 36 and cam follower 32 synchronize the oscillations of nozzles 18 with both the translational and the rotational movement of the workpieces such that the nozzles follow the translational movement of the workpieces for a predetermined period. Nozzles 18 follow the translational movement of the workpieces 22 until they have made at least one complete revolution in order to assure complete coverage. The spacing between spindles 24 along the conveyor elements 12 and 14 is determined by the amount of time it takes nozzles 18 to make a complete oscillation. It is not desirable to have workpieces within the streams during the return movement of the nozzles since the risk of incomplete coating under these circumstances is greatly increased. It is desirable, then, to have nozzles 18 return reasonably rapidly so that the spindles 24 may be more closely spaced. The distance traveled by a spindle during one complete oscillation of nozzles 18 is indicated by the designations between spindles 24e and 24d in FIG. 7. While spindle 24e, for example, travels a distance C, the workpieces on it are coated, and while this spindle travels a distance R, nozzles 18 return. Spindle 24e rotates one revolution in distance C.

Additional nozzle supporting shafts 56 and 58 (FIGS. 2 and 7), similar to nozzle supporting shaft 20, may be included. Nozzles 60 and 62 are supported by shafts 56 and 58, respectively. When additional nozzles are used, they should oscillate simultaneously with nozzles 18. This may be accomplished by mounting sprockets 55, 57 and 59 on shafts 20, 56 and 58, and connecting an endless chain 61 around these sprockets. Idler sprockets 64 are incorporated for adjusting the tension of chain 59. Nozzles 62 are used to direct air streams at workpieces 22, thereby removing any bubbles from the liquid on the workpieces.

In operation, motor 16 is turned on, thereby starting the movement of chains 14 and 12. A spindle 24 having workpieces 22 thereon is inserted in sockets 50 and 28 in advance of the coating zone. At this point, spindle 24 does not rotate. Prior to entering the spray zone, pinion 26 engages rack 30 and walks along it, thereby imparting a rotational movement to spindle 24 and consequently the workpieces 22. The streams from nozzles 18 impinge upon workpieces 22 at a point determined by cam 36. Follower arm 32 follows surface 39 of cam 36 and moves nozzles 18 in the direction the workpieces 22 are traveling. Nozzles 18 follow the workpieces 22 until they have made a predetermined number of revolutions within the spray. At this point, surface 37 on cam 36 swings nozzles 18 in the opposite direction. During this return movement, no workpieces are within the streams issuing from nozzles 18.

The next spindle is spaced from the first by a distance C plus R (FIG. 7) such that it enters the streams just as nozzles 18 have completed their return movement. When additional nozzles 60 are used, the workpieces pass through their streams in the same manner as through the streams from nozzles 18. Nozzles 62 employing air are used in conjunction either with nozzles 18 alone or with nozzles 18 and 60 to remove bubbles from the liquid previously applied. Rack 30 terminates beyond the limits of the streams issuing from nozzles 62 so that rotational movement of the workpieces ceases when spindle 24 leaves the coating area. When a spindle 24 reaches a position adjacent the spot where it was inserted into sockets 28 and 50, it is removed, and if desired, another loaded spindle is inserted. Thus the coating process is a continuous one.

By causing the nozzles to follow the conveyor and concurrently rotating or revolving the workpieces on the conveyor through at least one revolution, it is possible to reduce the number of nozzles substantially compared to prior art machines and still obtain complete coverage of the workpieces. Fewer nozzles means that there is less loss of pressure as the coating material flows through the nozzles, whether by gravity as is usually the case, or by forced flow. Also, the likelihood of nozzles becoming plugged is reduced, thus cutting down maintenance time. Less coating material is exposed at a given time, so solvent evaporation is reduced, thereby reducing costs and also making it possible to minimize exposure of workmen to noxious fumes.

I claim:

1. Apparatus for flow coating workpieces comprising a housing, means forming a conveyor in said housing for transporting workpieces along a predetermined path through the housing, said path of travel including a flow coating station and said conveyor being adapted to travel through a generally horizontal path through said flow coating station, a plurality of horizontally extending work-supporting spindles connected to said conveyor for translatory movement therewith, said spindles having their longitudinal axes extending transversely of the path of travel of the conveyor in a generally horizontal plane, means on said spindles for mounting a plurality of workpieces along the length thereof, means for rotating said spindles about their longitudinal axes while they travel past said flow coating station so as to revolve the workpieces supported thereon in a vertical plane about the horizontal longitudinal axes of the spindles, a nozzle support at said flow coating station, a plurality of nozzles on said support extending as a horizontal row above and transversely of said path of travel and generally parallel to the longitudinal axes of said spindles, means connecting said nozzles with a source of flow coating liquid, means for oscillating said nozzles in the direction of the path of travel of the workpieces on said support members and means for synchronizing the oscillation of said nozzles with the translatory and rotary movement of the workpieces such that the nozzles direct liquid generally downwardly toward and at the workpieces as the workpieces approach said row of nozzles and continue to direct liquid downwardly onto said revolving workpieces until the workpieces travel past the row of nozzles and thereafter the nozzles swing back to a starting position to direct liquid toward the workpieces on the next successive support member approaching said row of nozzles.

2. The combination called for in claim 1 wherein the means for rotating the work support members assures at least one complete revolution of each work support member while the nozzles are directing liquid on the workpieces supported thereby.

3. The combination called for in claim 1 wherein said synchronizing means comprises means interconnecting said oscillating means and said work support rotating means with said conveyor mechanism.

4. The combination called for in claim 1 wherein said synchronizing means includes a cam driven by said conveyor mechanism and a cam follower operatively associated with said cam and with said nozzle support for oscillating the nozzles.

5. The combination called for in claim 4 wherein said cam includes a gradually spiralled cam surface with which the cam follower engages when the nozzles oscillate in a direction to follow the workpieces traversing the flow coating station and a relatively abrupt generally radially extending surface which the cam follower engages to return the nozzles to said starting position.

6. The combination called for in claim 1 including a second row of nozzles in said housing spaced downstream from and generally parallel to said first row of nozzles, said second row of nozzles being connected to a source of fluid, and means for oscillating said second row of nozzles in timed relation with said conveyor mechanism and said first mentioned nozzle oscillating means such that when the workpieces move past the liquid streams directed from said first row of nozzles they travel into the path of fluid directed from the second row of nozzles.

7. The combination called for in claim 6 wherein the second row of nozzles are connected with a source of air under pressure.

References Cited
UNITED STATES PATENTS

| | | |
|---|---|---|
| 1,697,879 | 1/1929 | Olson. |
| 2,672,121 | 3/1954 | Peeps _____ 118—321 |
| 2,724,661 | 11/1955 | Juvinall _____ 118—314 X |
| 2,838,024 | 6/1958 | Rekettye _____ 118—321 |
| 3,296,999 | 1/1967 | Gamble _____ 118—322 |

ROBERT W. MICHELL, Primary Examiner

JOHN P. McINTOSH, Assistant Examiner

U.S. Cl. X.R.

118—314, 321, 322